(12) United States Patent
Bruce et al.

(10) Patent No.: US 6,543,142 B2
(45) Date of Patent: Apr. 8, 2003

(54) CHIP DEFLECTOR FOR A CIRCULAR SAW

(76) Inventors: Ray Floyd Bruce, 11982 Torrey Ave., Auburn, CA (US) 95602; Stephan R Bruce, 871 SE. First St., Bandon, OR (US) 97411; Terance C Bruce, 550 Grove St., Jacksonville, OR (US) 97570

( * ) Notice: Subject to any disclaimer, the term of this patent is extended or adjusted under 35 U.S.C. 154(b) by 0 days.

(21) Appl. No.: 09/815,097

(22) Filed: Mar. 21, 2001

(65) Prior Publication Data

US 2002/0133954 A1 Sep. 26, 2002

(51) Int. Cl.[7] .............................................. B23D 45/16
(52) U.S. Cl. ............................................ 30/391; 30/391
(58) Field of Search ........................... 30/124, 286, 390, 30/391

(56) References Cited

U.S. PATENT DOCUMENTS

| 3,662,796 | A | * | 5/1972 | Batistelli | 30/390 |
| 5,046,255 | A | * | 9/1991 | Lebreux | 30/390 |
| 5,235,753 | A | * | 8/1993 | Stumpf | 30/391 |

* cited by examiner

Primary Examiner—Hwei-Siu Payer
(74) Attorney, Agent, or Firm—Robert Samuel Smith

(57) ABSTRACT

A kerf deflector for a circular saw is mounted by wedging the deflector between a mounting bolt on the saw and a lip on the table of the saw. The deflector is constructed of clear plastic sections enabling the user to align the advancing blade with the cut line on the board. One section scoops up air from the rotating blade and directs the air between another section and the board surface being cut. The narrowing construction of the air passage strengthens the stream of air on the basis of the venturi principle.

4 Claims, 2 Drawing Sheets

CHIP DEFLECTOR FOR A CIRCULAR SAW

FIELD OF THE INVENTION

This invention relates to chip deflectors for circular saws and particularly to deflector that clips onto the hinging bolt of the saw table, is shaped to form a venturi airway in combination with the saw table is designed to facilitate a clear view of the cut line.

PRIOR ART AND INFORMATION DISCLOSURE

A number of guards and constructions have been disclosed to eliminate the problem of deflecting the sawdust generated by a rotating circular saw.

For example, U.S. Pat. No. 3,662,796 to Batistelli discloses a semicircular channel shaped guard that mates with and is secured to guard of the blade and has an extension over the board.

U.S. Pat. No. 5,235,753 to Stumpf discloses an upper housing shielding an upper portion of the blade and a lower housing hingably attached to shield a lower portion and which retracts as the blade advances into the work.

U.S. Pat. No. 5,046,255 to Lebreux discloses a device for deflecting air stream generated by the rotating blade including a lamina adjacent the side of the blade adapted to deflect the air through an aperture in the blade protector. A roof shaped member located in front of the aperture deflects the air downwardly against the surface being cut.

These devices are expensive to make, inconvenient to install and dismount, less effective in operation and are not compatible with the construction of saws that are presently on the market.

SUMMARY

It is an object of this invention to provide a chip deflector that provides improved visibility in terms of more effective removal of kerf and a single part that is made of clear plastic, can be made in one piece by injection molding and snaps onto or off of the existing circular saw without requiring and modification of the saw.

This invention is directed toward a single molded clear (preferably) polycarbonate part which can be described as a single sheet having a number of bends which define sections of the deflector that deflects chips from flying up in the face of the user. The deflector mounts onto power hand saws having a lip on the edge of the saw table that permits "snapping" the deflector into engagement with the saw between a forward hinge bolt of the hood and the raised edge of the saw table.

DESCRIPTION OF A BEST MODE

Figure 1:
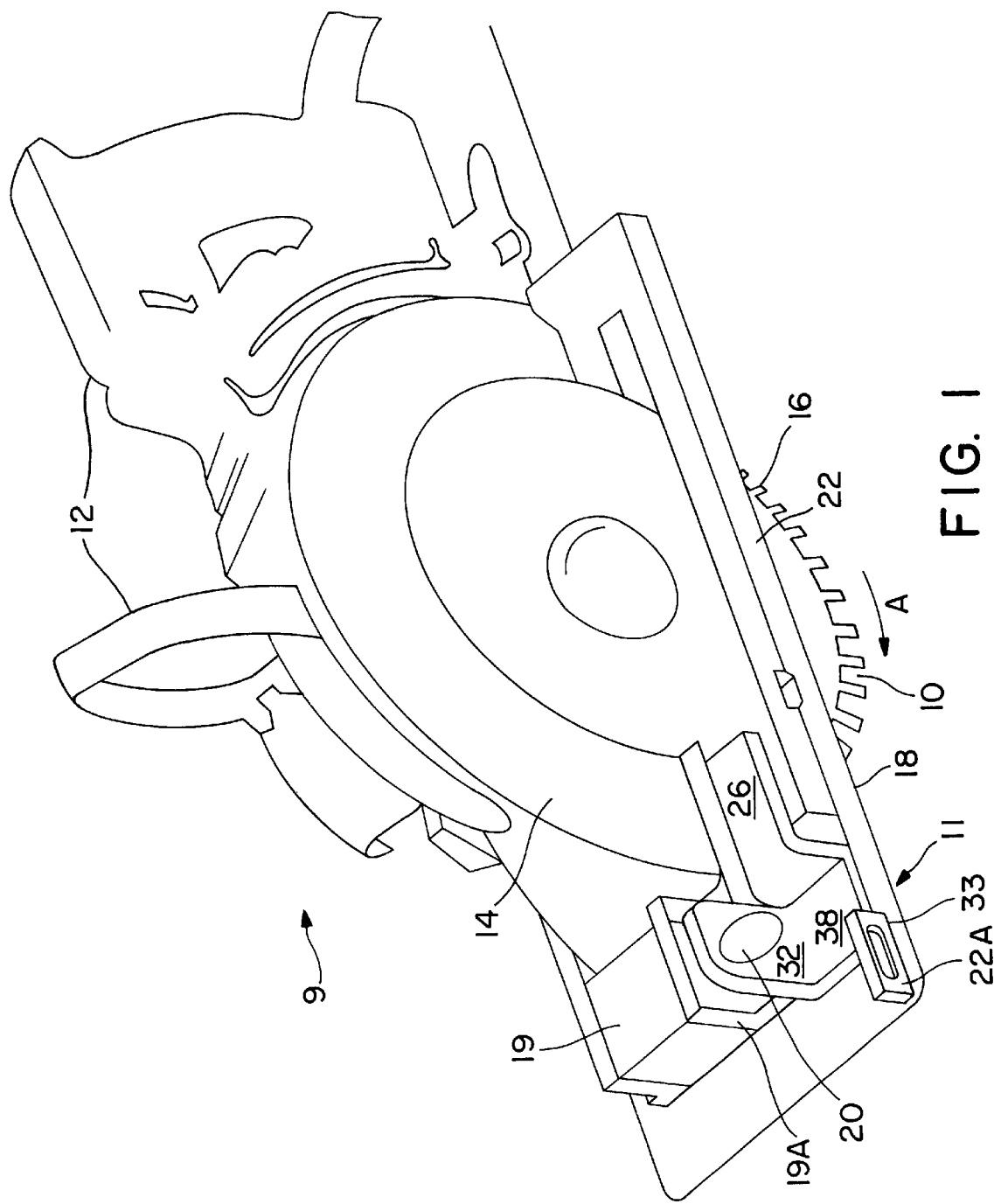
FIG. 1 shows the deflector of this invention mounted on the circular saw.
Figure 2:
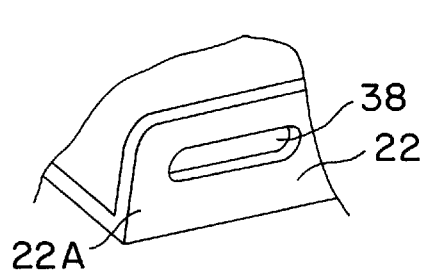
FIG. 2 is a perspective view showing the lip of the table.

Turning now to a discussion of the drawings, FIG. 1 shows a power hand saw 9 with the deflector 11 of this invention mounted on the saw 9. The saw has a circular blade 10 coupled to a motor (not shown) with handles 12 and having a shroud 14 that is secured over the cutting edge 16 of the saw blade. A table 18 is attached by a hinge 19 and hinging bolt 20 to the shroud 14 so that the depth of cut may be preselected and then secured by tightening the hinging bolt 20. A lip 22 is formed along the outer edge of the table thereby adding greater rigidity to the table 18. The end section 22A of lip 22 is shown in greater detail in FIG. 2 showing that the lip 22 typically has an elongated notch 38. The saw blade rotates in the direction of arrow A so that, when the saw blade turns, sawdust is thrown out ahead of the blade in the direction of advance of the blade. This condition causes generation of a stream of airborn sawdust that is thrown upward toward the face of the operator so that the operator has difficulties in seeing the line he is trying to follow. and must contend with the problem of the sawdust being directed toward his face and particularly his eyes.

Figure 3:
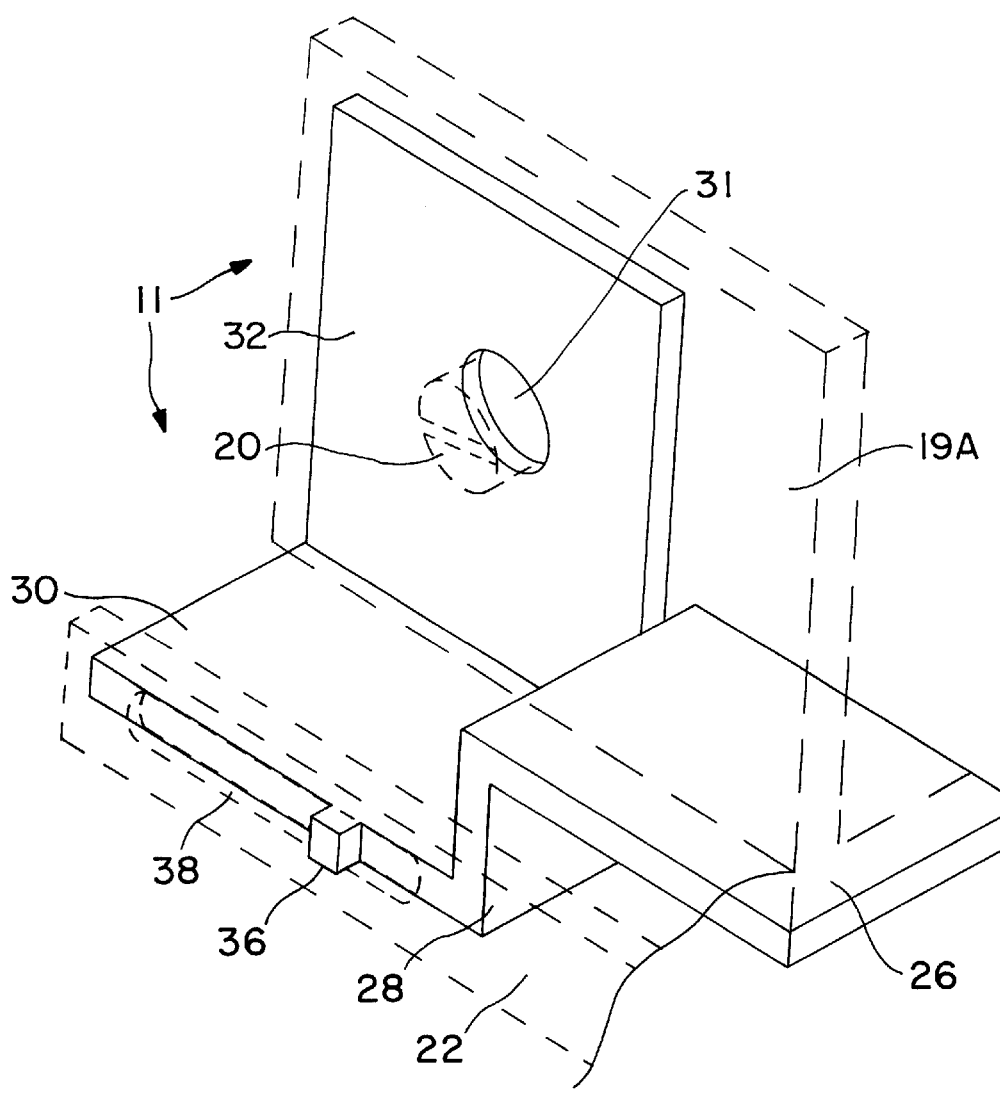
FIG. 3 shows details of the deflector mounted on the saw shown in phantom.

FIG. 1 shows the deflector 11 of this invention snapped into position on the saw. FIG. 3 shows in greater detail the positioning of the of the deflector 11 snapped into position between the lip 22 (in phantom and cutaway) and the hinge bracket 19A.

Construction of the invention is shown to best advantage in FIG. 3. The deflector 11 may be considered basically to be a plate having several sections attached edge to edge in which the various sections are joined edge to edge and cooperate to deflect the stream of kerf away from the face of the operator.

First section 26 directs the sawdust stream in a direction away from the saw and operator.

An edge of section 28 is angularly attached to section 26.

A third section 30 is angularly attached to an edge of the second section 28 opposite the first section 26;

A fourth section 32 has an edge attached to an edge of the third section 30 adjacent to the second section 28 and substantially perpendicular to the first, second and third sections.

Figure 4:
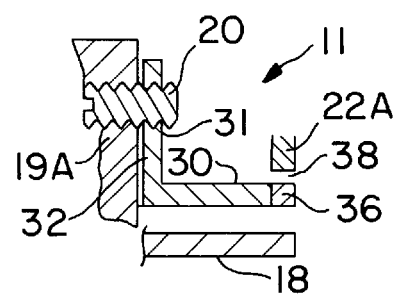
FIG. 4 shows a sectional view of the deflector mounted on the saw.

The deflector is positioned with the hinging bolt 20 (as shown in phantom in FIG. 3 and in section in FIG. 4.) extending through an aperture 31 in the fourth section 32 and an edge 35 of the third section pressed against lip 22 of the saw table 18. The deflector is made of slightly flexible clear plastic plastic so that the deflector 11 "snaps" into position between the lip 22 and the hinging bolt 20 such that third section 30 is parallel to the board. The third section is formed with a catch 36 along an edge which snaps into elongated aperture 38 in lip 22. Section 32 is shown with hinging bolt 20 through aperture 31 and edge 33 abutting lip section 22A of table 18.

In operation, as the cutting edge of the saw blade advances along the cutting line, sawdust and large chips which would otherwise bounce up into the face of the user, are deflected by the first section 26 and second section 28 away from the users face.

A major advantage of the deflector of this invention is that it is very easy to mount securely on existing power handsaws as well as its effectiveness in deflecting kerf away from the user.

What is claimed is:

1. A sawdust deflector for a circular saw, said circular saw being of the type having a circular blade (10) coupled to a motor (12), a shroud (14) secured over the cutting edge (16) of the saw blade, a table (18) attached by a hinging bolt (20) through a hinge bracket (19) to the shroud (14), a lip (22) formed along the outer edge of the table, and an aperture (38) in the lip (22) close to the end of the lip, said deflector comprising:

a first section plate (26);

a second section plate (28) having a second edge angularly attached to a first edge of the first section plate;

a third section plate (30) having a third edge angularly attached to an edge of the second section plate (28) opposite the first section plate (26);

a fourth section plate (32) having a fourth edge attached to an edge of the third section plate (30) adjacent to the second section plate (28) and substantially perpendicular to the first, second and third section plates;

said fourth section plate having an aperture;

said first, second, third and fourth section plates operably arranged in combination with said third section plate (30) having a catch (36) along an edge (35) of said third section plate opposite said fourth edge;

said first, second, third and fourth section plates arranged in operable combination with one another and with said hinging bolt and said elongated aperture in said lip to mount said deflector on said circular saw wherein an end of said hinging bolt extends through said aperture in said fourth section plate and said catch extends through said aperture in said lip.

2. The deflector of claim 1 wherein said third plate section has a width selected to provide that an edge of said third plate section opposite said edge of joining said fourth section plate is wedged against said lip.

3. The deflector of claim 2 wherein said deflector is made of polycarbonate.

4. The deflector of claim 1 comprising:

said first, second, third and fourth section plates being made of a clear plastic having sufficient flexibility to permit securely wedging said deflector into a position between said lip (22) and said hinge bracket (19).

* * * * *